Patented Aug. 18, 1953

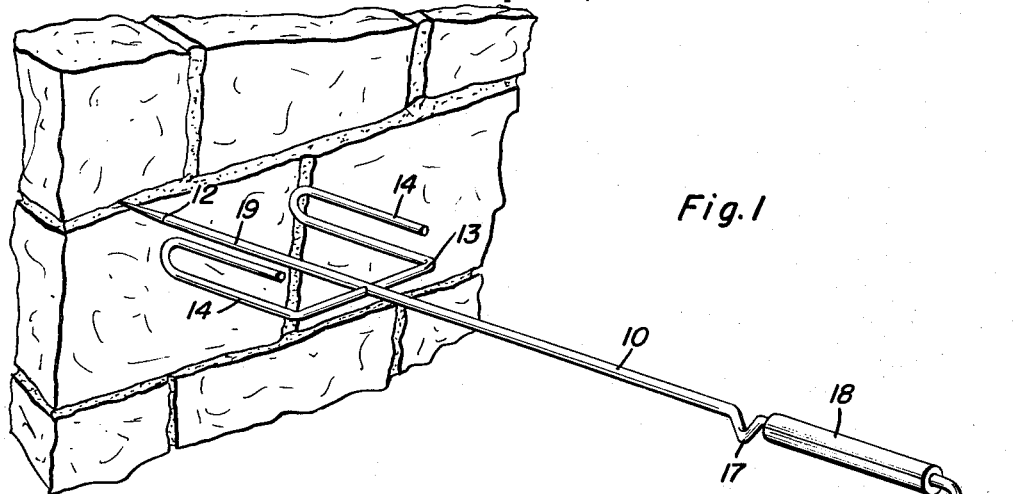
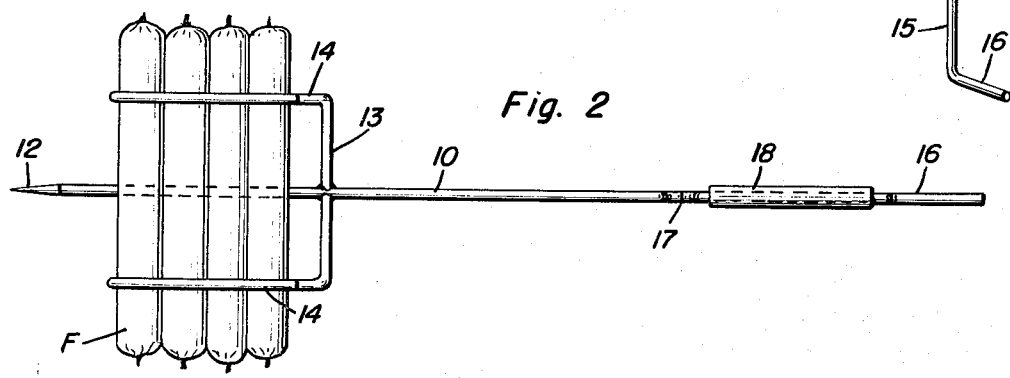
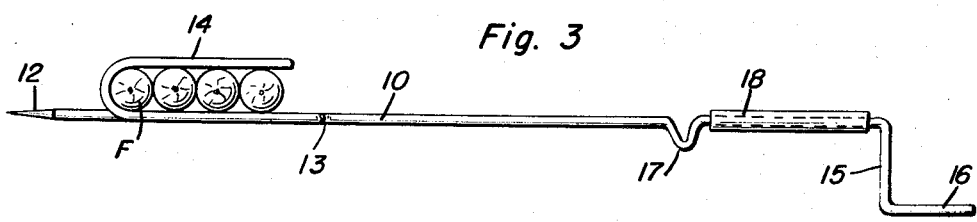
Randolph F. Wickman
INVENTOR.

2,649,042

UNITED STATES PATENT OFFICE 2,649,042

BARBECUE ROASTER

Randolph F. Wickman, Los Angeles, Calif.

Application September 14, 1950, Serial No. 184,851

1 Claim. (Cl. 99—441)

This invention relates to barbecue apparatus, and more particularly to the spit to hold material to be cooked over an open fire, such as a campfire or a barbecue fireplace.

A primary object of the invention is to provide a barbecue spit that enables the food to be securely held without piercing the food, thus allowing the flavorful juices to be retained.

Another object of this invention is to provide a smooth holder which can be relied upon to hold the food securely.

Another object of this invention is to provide a food holder which enables food to be readily turned so that all sides of the food will be presented to the fire for uniform cooking.

Another object of this invention is to provide a simple and efficient handle and handle retention means for a barbecue spit, making the same convenient and safe to hold.

A last object to be specifically mentioned is to provide a barbecue spit of the character mentioned above which will be relatively inexpensive and practicable to manufacture, which is safe to use inasmuch as the device will not ordinarily slip out of control, and which will give generally efficient and durable service.

With these objects definitely in view, this invention resides in certain novel features of construction, combination and arrangement of elements and portions that will be hereinafter recited in detail in the specification, particularly pointed out in the appended claim, and illustrated in the accompanying drawing, which forms a material part of this application, and in which:

Figure 1 is a view, in perspective, of the assembled device, the figure including a fragmentary showing of a masonry fireplace;

Figure 2 is a plan view of the spit with a plurality of frankfurters; and

Figure 3 is a side elevational view of the structure shown in Figure 2.

Similar characters of reference designate similar or identical elements and portions throughout the specification and throughout the different views of the drawing.

Referring now to the drawing in detail, the numeral 10 indicates the metallic elongated rod, this rod being constructed of aluminum or some other metal which is unaffected by high temperatures used in cooking. The forward end of the rod comprises a point 12, which enables the spit to be supported over a fireplace or campfire, and the point is adapted to be wedged in crevices in the stone or brick work of a barbecue fireplace or supported on knurled ledges, during actual use. At an intermediate point on the rod 10, opposed cross bars 13 are welded. Integral with the cross bars 13 are U-shaped members 14, one end of one leg of each of said U-shaped members being integral with an outer end of one of said cross bars 13. U-shaped members extend substantially parallel to the rod 10, and are disposed in opposed relation, one on each side of the rod, one leg of each of these U-shaped members being coplanar with an adjacent portion of the rod 10, while the other leg of the U-shaped members are similarly spaced parallel to each other on one side of the rod 10, so that food F, represented by a plurality of frankfurters, can be retained with outer end portions of the food clamped between the legs of the U-shaped members 14 and with a central portion of the food engaging an adjacent portion of the rod 10. The U-shaped members may be considered as defining a pocket on one side of the rod 10, intermediate the ends of this rod adjacent the point 12.

At the other end of the rod 10 is a crank with a transverse portion 15 and a crank handle 16, the crank handle extending parallel to the rod 10. Intermediate the ends of the rod 10, and on the side of the U-shaped members remote from the point 12, is a stop 17 which is comprised of a V-shaped portion in the rod. Between the stop 17 and the transverse portion 15 of the rod is a hollow cylindrical handle 18 which will be constructed of wood, plastic, or other non-metallic material, so as to limit conduction of heat from the rod to the hands of the user. The handle 18 is mounted coaxially on the rod 10 and may be grasped in one hand while the handle portion 16 of the crank may be grasped by the other hand to turn the food that is being barbecued so that all surfaces of the food are presented to the fire and the food uniformly cooked.

The operation of this invention will be clearly understood from a consideration of the foregoing description of the mechanical details thereof, taken in connection with the drawing and the above recited objects. In recapitulation, it may well be stressed that the U-shaped members 14 are slightly resilient so that the food F is clasped tightly therein. Furthermore, it should also be noted that the part 19 of the rod 10 supports the food when the spit is in a position corresponding to that shown in the figures, this being important inasmuch as it is frequently desirable that the center portion of the food be supported when movement of the spit other than rotational is required, as during the initial placing of the food on the spit and in the removal of the cooked food from the fire and the serving of the food at a distance from the fire. It will be clear that all the objects are amply achieved and further description would appear to be unnecessary.

Having described the invention, what is claimed as new is:

A barbecue roasting spit comprising, a rod including a straight forward portion terminating in a point adapted to be embedded in a wall of a barbecue oven for rotatably supporting said rod at its forward end thereon, transversely aligned bars on said forward portion of the rod, substantially U-shaped members on the outer ends of the bars extending forwardly therefrom in spaced parallelism with the rod and providing, in conjunction therewith, a support for a plurality of frankfurters, the bight portions of said members being forwardmost, said straight portion of the rod extending forwardly beyond said members, a crank on the rear end of the rod for rotating same, and a tubular handle journaled on the rod adjacent the crank for rotatably supporting said rod at the rear end thereof.

RANDOLPH F. WICKMAN.

References Cited in the file of this patent

UNITED STATES PATENTS

| Number | Name | Date |
| --- | --- | --- |
| 281,683 | Gibson | July 24, 1883 |
| 492,517 | Bitner | Feb. 28, 1893 |
| 1,313,417 | Raymond | Aug. 19, 1919 |
| 1,869,299 | Bracht | July 26, 1932 |
| 1,985,571 | Hetzel | Dec. 25, 1934 |
| 2,004,659 | Groch | June 11, 1935 |
| 2,191,226 | Clem | Feb. 20, 1940 |
| 2,263,715 | Bobo | Nov. 25, 1941 |
| 2,285,271 | Hafner et al. | June 2, 1942 |
| 2,317,388 | Lako | Apr. 27, 1943 |
| 2,485,890 | Keljik | Oct. 25, 1949 |
| 2,486,496 | Romazon | Nov. 1, 1949 |
| 2,535,548 | Porter | Dec. 26, 1950 |

FOREIGN PATENTS

| Number | Country | Date |
| --- | --- | --- |
| 86,994 | Sweden | Aug. 4, 1936 |
| 399,279 | Great Britain | Oct. 5, 1933 |